UNITED STATES PATENT OFFICE.

WILLIAM S. CORBY AND CHARLES I. CORBY, OF WASHINGTON, DISTRICT OF COLUMBIA.

ART OF MAKING DOUGH FOR BREAD.

SPECIFICATION forming part of Letters Patent No. 629,239, dated July 18, 1899.

Original application filed November 19, 1897, Serial No. 659,109. Divided and this application filed March 3, 1899. Serial No. 707,681. (No specimens.)

*To all whom it may concern:*

Be it known that we, WILLIAM S. CORBY and CHARLES I. CORBY, citizens of the United States, residing at Washington, in the District of Columbia, have invented certain new and useful Improvements in the Art of Making Dough for Bread, of which the following is a specification.

It is well known that the flour of wheat differs from that of all other seeds and grains in that a dough made therefrom is coherent to a greater degree than a dough made from any other flour, and this is due to the gluten of the wheat, which when combined with water forms a tenacious elastic mass. The gluten of wheat owes its peculiar characteristics largely to the presence of two proteid substances, known as "gliadin" and "glutenin," and it is believed by us to be because of these substances and the peculiarities of the gluten into which they enter as constituents that wheat-flour is so peculiarly adapted for the making of leavened or fermented bread. Owing to the coherent nature of the gluten the dough formed from wheat-flour can be made to retain within it the carbonic-acid gas arising from the growth of yeast, and also bodies of air to assist in the proper action of the dough ingredients.

In the making of a theoretically-perfect dough there are several desiderata: First, every molecule of the gluten-forming constituents contained in the flour should be provided with an amount of water sufficient to perfectly hydrate it, and thereby develop the strength of the dough; second, the particles of the yeast or other ferment employed should be uniformly distributed throughout the dough and be brought into contact with the materials necessary to and under conditions favorable to its growth in order that the action of the yeast upon the flour shall be facilitated and that the gas generated shall be uniformly distributed throughout the dough mass, and, third, in a perfect dough, the gluten fully hydrated, as aforesaid, the starch and other materials contained in the flour must be so related to the yeast or other ferment as that practically every particle of the latter will be surrounded with a coating of gluten in order that the gas developed shall be distributed with uniformity throughout the dough mass, so that there may be uniformity in the distribution and size of the pores of the completed bread.

The present invention relates to the attaining of the above-described desiderata by means of a series of steps which insure that they (the desired thorough commingling of the ingredients and bringing them mutually particle by particle into advantageous juxtaposition) are reached at a stage anterior to any material breaking down or disintegration of the more valuable ingredients of the dough, such as the proteids, and particularly the gluten masses; and among the objects of the invention are to obtain an approximately perfect blending of the dough ingredients by a novel manner of dough manipulation or treatment, in which it is subjected to drawing out, sheeting, or shredding operations, and, second, to provide a method by which all of the above-described desiderata or requirements can be attained at one initial and complete operation wherever the materials and conditions permit.

In order to insure a better understanding of our invention and to distinguish it from the prior art, we will first describe the steps which have heretofore been followed in the manufacture of dough for leavened bread.

First. The flour and certain quantities of water, yeast, salt, and other ingredients are put into a receptacle either all at one time—as, for instance, in making what are known as "straight" doughs—or at different stages in the mixing operations—as, for instance, in making what are known as "sponge" doughs—and these ingredients are mixed to a certain extent either by hand or machine and are kneaded into a somewhat stiff coherent dough. The dough thus made is then put into a trough or other receptacle and allowed to stand for several hours, when it will have become partially raised or leavened by the development of the gas under the action of the yeast or other ferment. Up to this point, owing to the incomplete combination of the particles of gluten or gluten-forming bodies with water, there still remains a considerable amount of gluten or gluten-forming bodies which have not been fully hydrated, and the mass has by no means reached that glutinous, tenacious, and elastic condition which is theoretically and practically possible, in view of the amount of gluten-forming bodies contained in the flour and the amount of water which it is possible for such bodies to take up in their complete hydration. Owing to these conditions the dough is not in the best condition for baking. Further, owing to the incomplete mixing or dissemination of the yeast throughout the dough mass in its initial treatment the latter is as yet in no condition for baking for the reason that it is raised or leavened at certain spots only and a large part thereof still remains heavy and dense. In consequence of these conditions further operations become necessary.

Second. The next step in the dough-making operation is to knead over the mass for the purpose of increasing the strength of the dough, more completely disseminating the yeast throughout the mass and opening out the heavy unleavened portions, so that the yeast may be brought into contact with these portions, from which it can obtain more sugar to convert into carbonic-acid gas, and thus increase the quantity of gas which causes the raising of the dough. After this operation the dough is allowed to stand for several hours more or until a further amount of gas is generated and until the heavy unleavened portions of the dough are gradually leavened.

Third. The next step is to once more subject the dough to a kneading process, so that in the manner already described the leaven may be still further disseminated and the strength of the dough further developed, after which the dough is again allowed to stand and rise. This rekneading is subsequently repeated as often as may be necessary until the entire mass of dough is brought to such a degree of lightness and strength that it may safely be divided into loaves and baked, with the expectation that the bread will be light and wholesome.

The process just described occupies a long time—from seven to twelve hours—and the results attained thereby are only approximately perfect at best, as may be seen from the irregularities in the size of the cavities left by the gas in the bread, due to the irregular dissemination of the yeast throughout the dough, the incomplete development or hydration of the gluten, and the partial breaking down of the tenacious characteristics of the gluten incident to the length of time elapsing between the initial mixing and the baking operations, and, as may be further seen, by the unduly-rapid drying of the baked loaf, due, as we believe, to the unhydrated gluten in the bread absorbing the moisture from the other parts thereof and so robbing them of the moisture that they should retain for wholesomeness and palatability.

In the process just described the dough, both during the initial mixing and kneading operation and the subsequent rekneading operations, is maintained during the manipulations to which they are subjected in mass condition, being kneaded, pressed together, squeezed, and thumped, operations which have rendered the complete hydration of the gluten or gluten-forming bodies and the perfect dissemination of the yeast or ferment throughout the mass practically impossible, as is uniformly recognized by the trade and by those who have made a careful study of the bread-making art. It is quite evident that the attempts to reorganize the mass of dough after it is first mixed or formed into a coherent mass by kneading or treating the dough while maintained in mass condition and the thorough mixing and combination of the ingredients is but imperfectly accomplished even with the most careful and painstaking treatment, as the tough and tenacious condition of the dough makes it impossible to subdivide and mix or blend it by such kneading operations, which operate to press together or squeeze the dough in mass. The rekneading operations which have been described cannot therefore uniformly mingle and distribute the imperfectly-leavened portions of the dough or mingle and bring into such intimate contact as to permit union of the gluten and gluten-forming ingredients and the water, so as to insure complete hydration of such materials. The rekneading operations described have been and under practical conditions must be performed by hand and, though necessarily superficial in the results attained, and thus imperfect, have been necessary in following the old process, as without them the dough cannot be brought to even the ordinary condition for baking. It will thus be seen that the theory upon which heretofore the manipulation of dough has proceeded in order to bring it to a condition suitable for baking has been that the dough must be pressed together, squeezed, thumped, or kneaded while maintained in mass condition in order to mix the ingredients and disseminate the yeast. We have discovered, however, that decidedly novel and advantageous results are attained by proceeding upon another theory of dough manipulation—namely, this, the drawing out or subdividing of the dough after the first mixing of the ingredients to form them into a coherent mass into sheet-like or shred-like submasses or particles and recombining these with the main mass and repeating these operations rapidly and many times until the entire mass assumes a condition of approximately-perfect homogeneity.

We have discovered that the long and tedious process hereinbefore described is wholly unnecessary and that the results obtained from it, while giving a more or less satisfactory sort of bread accordingly as care and skill are observed in carrying out the process, have never been such as are theoretically and practically possible. By our process we not only very closely approximate theoretically perfect results, but also eliminate much of the uncertainty attending the processes heretofore in vogue and which are incident to the individual skill and conscientious care of those carrying out such process, and we substitute therefor the uniformity and certainty incident to machine-work results.

One part of our invention consists in a process whereby we are able to secure at the outset and in one initial and complete operation the results hereinbefore referred to—that is to say, the complete hydration of the gluten simultaneously with the bringing of the yeast into complete contact with the gas-producing elements by perfectly mixing or disseminating it throughout the dough as the latter is produced and the complete surrounding of the yeast particles thus disseminated by the glutinous envelops. The result is that practically every particle of the gluten, the most important constituent of the flour, is brought into the condition required for making wholesome bread, and this gluten, in its elastic tenacious condition, due to perfect hydration, is formed about each and every particle of yeast. In other words, we secure in a few minutes such a mingling of the several elements of the dough as has never heretofore been attained and which has only been approximated by the slow and tedious methods heretofore followed; and our invention further consists in a process of treating or manipulating dough after it has been formed into a coherent mass by rapidly drawing out from the main dough mass particle by particle of such mass and again recombining said particles with the main mass, and continuing such operations until the drawn-out particles assume sheet or shred like forms of great tenacity, by which treatment the dough is made to assume a condition of practically perfect homogeneity and smoothness.

We will now describe what we consider to be the most approved manner of carrying out our invention.

We place the flour, yeast, lard, and other desired ingredients together and add thereto about thirty-eight per cent. more water than has heretofore been customary—that is, we use about eighteen gallons of water for each one hundred and ninety-six pounds of flour, whereas the usual practice has been to employ about thirteen gallons water for the same amount of flour. All of these ingredients in an unmixed condition are placed in a machine which preferably consists of a vessel adapted to contain the ingredients and the dough as it is made, and in which vessel is arranged a horizontal rotary beater—that is, a beater having a series of beater bars or blades parallel or approximately parallel with the axis of rotation of the beater and which is so geared as to be driven at high speed, a speed sufficiently great to cause the dough being formed to be carried around by the arms or bars of the beater and to be acted upon thereby in a manner to be described. The materials being thus placed in the machine the beater is run at high speed and in a short time (about a minute) they are so mixed as to produce a mass of moist dough, but rough in appearance and having very little tenacity. The rotation of the beater continuing causes a series of rapidly-recurring cycles of agitation in this mass, breaking it up into minor masses, which are thrown about by the centrifugal action of the beater, and this condition continues for five or six minutes after the apparatus is started. The operation of the machine being continued, it will soon be noticed that the minor masses of dough into which the main mass was broken up, as before described, begin to adhere with each other and with the main mass to a greater and greater extent, showing a rapid development of the glutinous condition of the dough, due to the more and more perfect hydration of the gluten. At about this stage in the process there occurs a very complete and rapid breaking up or disintegration of the little clusters or nodules of mutually-adhering unmixed particles of flour, and the dough begins to become so tenacious and elastic as to permit it to extend from bar to bar of the beater in strings, folds, sheets, and membranes, the centrifugal effect of the beater causing the dough to be worked almost wholly by the peripheral or outer bars of the beater and against the walls of the casing or vessel, such walls tending to retard the movement of the dough, while the blades, rapidly revolving, draw it out into thin sheets and membranes, which are carried around by the beater and folded one upon another until, accumulating in sheets, these are thrown off by the centrifugal action against the walls of the vessel, to be again caught up and shredded and sheeted by the blades. This operation is continued for about twenty minutes from the starting of the apparatus, at which time the dough is of a perfectly homogenous texture.

During the drawing out of the dough into sheets, membranes, shreds, and fiber-like submasses and again uniting these by folding one sheet upon another air is inclosed between the folded sheets or membranes, and being confined by the tenacious glutinous condition of the dough is worked through the entire mass, so that the dough formed by our process becomes thoroughly aerated simultaneously with the mixing operations.

We believe that this process or method of dough treatment, which consists in the drawing out of the dough into sheets, membranes, shreds, and fiber-like particles or submasses, which are reunited with the main dough mass and the process repeated rapidly again and again is entirely novel in the art of dough-making at whatever stage in the process relative to the first mixing of the ingredients it may take place.

The dough made by our process, as hereinbefore described, is preferably put into a trough or receptacle and allowed to stand for an hour or a little more for the yeast to develop, when it may be molded and baked. The dough may, however, be permitted to stand for a considerable time without injury, due to the perfect dissemination of the yeast throughout the mass and the complete hydration of the gluten, so that each particle of yeast is surrounded by a tenacious glutinous envelop, which causes a uniform pressure of the expanding gas throughout the entire mass, with no excessive pressure at any point due to a local overactivity of the ferment and to an insufficiently tenacious gluten wall to confine the gas. There is also no portion of the dough remaining unleavened and heavy, and the shorter time required for raising the dough diminishes the products of bacterial growth and the formation of acids is kept at a minimum and the danger of spoiling the dough and ruining the bread is avoided. The baked bread from this dough is thoroughly light and uniformly porous and is unusually white in appearance as compared with breads made by the common process, particularly when made from the higher grades of wheat-flour, this latter characteristic being also present in a marked degree in the dough made according to our process, which is strikingly whiter than the doughs made according to the usual method (reference again being made particularly to doughs made from good wheat-flour.) Another characteristic of our dough is its great strength, incident, of course, to the perfect development of the gluten, which enables it, even when made very soft, to retain its shape when subdivided and when molded, which characteristic is of great importance, as tending to facilitate the making of uniformly and well shaped loaves. Another and a striking result of our process is the increased output of bread which can be made from a given amount of flour, which amounts when using certain grades of flour to no less than from twenty (20) to thirty (30) more pound loaves of bread from a single barrel of flour than is possible to obtain according to the old method of procedure. This is due to the fact that there is practically no unhydrated gluten left in the dough and bread, all having entered into union with the water supplied at the initial mixing of the ingredients. This does not mean that water is injected into the dough or added thereto as an adulterant, which would make a sloppy dough difficult or impossible to handle if proceeding according to the old methods, since it (the water) has as such disappeared and is united with the gluten or other ingredients of the dough.

According to some authorities there is a considerable loss in the valuable and nutritive elements of the flour during its fermentation according to the usual methods of procedure, and that this loss is especially large in the nitrogenous parts of the flour, and that the longer the period of fermentation the greater the loss. By our process hereinbefore described, where the period of fermentation may be reduced to a marked degree, only from a third to a tenth as much time being required as when proceeding according to the usual methods, there is a great saving in the valuable properties of the flour, as there is little, if any, breaking down or decomposition of the nitrogenous elements of the flour taking place so shortly after the initial mixing of the dough.

In another application for patent, Serial No. 659,109, filed November 19, 1897, and of which case this is a divisional application, we have shown a machine which is especially adapted for the working of the process herein described and claimed. We do not, however, limit the invention which forms the subject-matter of this case to its being carried out or worked by the particular apparatus shown in the aforesaid application, as it is evident that it may be carried out by machines or apparatus differing more or less therefrom. We prefer, however, a machine similar to that shown in said application and described in its more general features in this specification, as by means thereof we are permitted to work the entire process herein described in one machine and as a continuous operation from the first agitation of the unmixed ingredients to the complete formation of a homogeneous dough, the machine thus serving first as a mixer to bring the ingredients into the condition of a coherent mass, and after this has been accomplished operating to draw out, shred, and sheet the dough mass, as hereinbefore described.

While we have spoken of the part of the apparatus herein referred to which effects the drawing out, shredding, and sheeting of the dough as a "beater," we wish to be understood as using this term as descriptive of a part of an organized apparatus and not as specifically descriptive of such part, as it is not primarily the function of this part to act upon the dough with successive blows or impacts, but, rather, to operate as a means or agency for effecting the drawing out and sheeting operations hereinbefore referred to.

We do not in this application claim the process of making or manipulating dough which consists in first mixing the dough ingredients to form them into a coherent mass, then allowing such mass to stand and be lightened by the action of the yeast or leaven, and then subjecting it to operations which draw out, shred, and sheet it, as such specific process forms the subject-matter of another application, filed by us on the 6th day of June, 1899, Serial No. 719,589, preferring herein to claim only those features of invention which are common or generic to the process described in this case and to that of the last-referred-to application and to those features which are specific to the process set forth in detail herein.

Having thus described our invention, what we claim, and desire to secure by Letters Patent, is—

1. In the art of making dough for fermented bread, the herein-described process, which consists in intermingling the constituents of the dough to form a coherent mass, and, after such mass has been formed, rapidly drawing out or separating from the main dough mass portion after portion of such mass, and again combining such portions with the main mass, and continuing such operations until the said draw-out portions assume sheet-like and shred-like forms of great tenacity, and capable of being drawn into membranes, sheets, and shreds of extreme thinness, substantially as set forth.

2. In the art of making dough for fermented or leavened bread, the herein-described process, which consists in completing the intermingling and combination of substantially all of the gluten of the flour with water, prior to the breaking down or decomposition of the nitrogenous elements of the flour, and simultaneously disseminating the yeast, whereby there is effected a complete hydration of the gluten and dissemination of the yeast therein and therethrough, while the gluten retains its full strength, substantially as set forth.

3. In the art of making dough for fermented or leavened bread, the herein-described process, which consists in mechanically bringing into contact and union with the water all of the gluten particles of the flour, thereby completing the hydration of the gluten, and simultaneously disseminating the yeast or ferment within the said hydrated gluten, at one initial operation, and prior to the dough being allowed to rise under the influence of the yeast or ferment, substantially as set forth.

4. In the art of making dough for fermented or leavened bread, the herein-described method of mixing the dough ingredients and hydrating substantially all of the glutinous constituents of the flour simultaneously and at one initial operation, prior to the dough being allowed to rise under the influence of the yeast or ferment, which consists in repeatedly shredding or drawing out into shred, sheet, or membranous form of extreme thinness, the mass of dough, and recombining the portions thus shredded or sheeted, substantially as set forth.

5. In the art of making dough for fermented or leavened bread, the herein-described process of mixing the ingredients and hydrating substantially all the glutinous constituents of the flour at one initial operation, which consists in repeatedly shredding or drawing out the mass of dough into sheet or membranous form, and, when the dough has become highly tenacious through the hydration of the gluten, folding such sheets or membranes one upon another, thereby confining air between them, and recombining them into the mass of the dough, whereby, during such initial mixing process, the entire mass becomes aerated, substantially as set forth.

6. In the art of making dough for fermented or leavened bread, the herein-described process, consisting, first, in mingling together the ingredients of the dough to form a coherent mass, second, in rapidly moving the mass, or portions thereof successively, around an axis of rotation, with a centrifugal speed, until sheets or shred-like submasses are produced, third, in recombining the said sheets or submasses into a general dough mass, and, fourth, continuing the said sheeting and shredding and recombining operations rapidly, to completely and quickly distribute the yeast or ferment and hydrate the gluten, substantially as set forth.

7. In the art of making dough, the herein-described process, consisting first in mingling together the ingredients of the dough and partially hydrating the gluten, forming a coherent dough mass, and then causing the said mass, or portions thereof, to move rapidly around an axis of rotation with a centrifugal speed, and throwing off, by centrifugal force, masses or portions of the dough, recombining these into the general dough mass, and repeating said operations to complete the hydration of the gluten, substantially as set forth.

8. In the art of making dough for fermented or leavened bread, the herein-described process, which consists in mixing the flour and water, with the other ingredients of the dough, in the proportions of one hundred and ninety-six pounds of flour to approximately eighteen gallons of water, and then, after they have become a coherent mass, completing the hydration of substantially all the gluten and simultaneously disseminating the yeast or ferment, within this hydrated gluten at one initial and continuous operation, and prior to the dough being allowed to rise under the influence of the yeast or ferment, substantially as set forth.

9. In the art of making dough for fermented or leavened bread, the herein-described process, which consists in mechanically completing the intermingling of substantially all of the gluten of the flour with water, thereby completing the hydration of the gluten, and simultaneously disseminating the yeast or ferment within the said hydrated gluten, at one initial operation, and prior to the dough being allowed to rise under the influence of the yeast or ferment, then permitting the dough so made to rise, and then subdividing and baking the same before any breaking down or decomposition of the nitrogenous elements of the flour takes place under the action of the ferment, substantially as set forth.

WILLIAM S. CORBY.
CHARLES I. CORBY.

Witnesses:
J. S. BARKER,
GEO. R. LINKINS.